(12) United States Patent
Francis et al.

(10) Patent No.: US 10,817,550 B2
(45) Date of Patent: Oct. 27, 2020

(54) TECHNIQUE FOR TRACKING KEYWORD PERFORMANCE

(71) Applicant: T-Mobile USA, Inc., Bellevue, WA (US)

(72) Inventors: Peter M. Francis, Bellevue, WA (US); Peter Nicholas Morrelli, New York, NY (US)

(73) Assignee: T-Mobile USA, Inc., Bellevue, WA (US)

( * ) Notice: Subject to any disclaimer, the term of this patent is extended or adjusted under 35 U.S.C. 154(b) by 209 days.

(21) Appl. No.: 16/145,823

(22) Filed: Sep. 28, 2018

(65) Prior Publication Data
US 2020/0104411 A1  Apr. 2, 2020

(51) Int. Cl.
*G06F 16/31* (2019.01)
*G06F 16/951* (2019.01)
(Continued)

(52) U.S. Cl.
CPC ........ *G06F 16/313* (2019.01); *G06F 16/3334* (2019.01); *G06F 16/90335* (2019.01); *G06F 16/951* (2019.01)

(58) Field of Classification Search
CPC ............. G06F 16/313; G06F 16/90335; G06F 16/3334; G06F 16/951
(Continued)

(56) References Cited

U.S. PATENT DOCUMENTS 7,827,170 B1 * 11/2010 Horling ............. G06F 16/24578
                                                       707/722
8,209,331 B1 *  6/2012 Garg ..................... G06F 16/951
                                                       707/734
(Continued)

FOREIGN PATENT DOCUMENTS

CN         102446171 B    8/2015

OTHER PUBLICATIONS

"180Fusion", 180 Fusion.com Digital Marketing Experts, retrieved Sep. 28, 2018 at https://consult.180fusion.com/?gclid=EAlalQobChMIt5rx8f2F3Q1VShtpCh3OUQWuEAAYASAAEgJt-KvD_BwE&_vsrefdom=p.12489, 4 pgs.
(Continued)

*Primary Examiner* — Dung K Chau
(74) *Attorney, Agent, or Firm* — Lee & Hayes, P.C.

(57) ABSTRACT

The systems, devices, and techniques described herein are directed to tracking keyword performance associated with search engine optimization. For example, the systems, devices, and techniques described herein can include determining a list of keywords relevant to a website and determining a ranking of the website in search results responsive to individual keywords of the list of keywords. A selection rate associated with search rankings can be determined, as well as a query volume of keywords over time. A keyword ranking index (KRI) can be determined based on the list of keywords, rankings of keywords, selection rates associated with rankings, and expected query volumes. In some
(Continued)

instances, the KRI may represent a weighted sum of expected query volume divided by a maximum expected volume associated with the keyword list. Thus, the KRI provides an improved determination of keyword performance with respect to search engines and keyword rankings associated with a website.

20 Claims, 7 Drawing Sheets

(51) Int. Cl.
*G06F 16/33* (2019.01)
*G06F 16/903* (2019.01)

(58) Field of Classification Search
USPC .......................................................... 707/748
See application file for complete search history.

(56) References Cited

U.S. PATENT DOCUMENTS

| | | | | |
|---|---|---|---|---|
| 2007/0127650 A1* | 6/2007 | Altberg | .............. | G06Q 30/0275 379/114.13 |
| 2009/0048925 A1 | 2/2009 | Song et al. | | |
| 2014/0025668 A1* | 1/2014 | Lin | .................... | G06F 16/24578 707/723 |
| 2015/0112980 A1* | 4/2015 | Sanio | ................. | G06Q 30/0242 707/728 |
| 2017/0061528 A1* | 3/2017 | Arora | .................... | G06F 16/958 |
| 2019/0138563 A1* | 5/2019 | Ogden | ................. | G06F 16/958 |
| 2019/0303503 A1* | 10/2019 | Hu | .................... | G06F 16/24578 |

OTHER PUBLICATIONS

"Amazon KW Index and Rank Checker", Chrome Web Store, retrieved from https://chrome.google.com/webstore/detail/amazon-kw-index-and-rank/dehlblniikkbapjemjbeafihipjoifii?hl=en on Sep. 28, 2018, 2 pgs, (1st page screen shot).

"How to calculate the Average Weighted Ranking for SEO Keywords", Kyle Chivers Blog, Mar. 2018, retrieved at https://kylechivers.com/blog/seo/how-to-calculate-the-average-weighted-ranking-for-seo-keywords/, Sep. 28, 2018, 6 pgs.

Wikipedia, "Search Engine Optimization", retrieved Sep. 28, 2018 at https://en.wikipedia.org/wiki/Search_engine_optimization, 9 pgs.

\* cited by examiner

TECHNIQUE FOR TRACKING KEYWORD PERFORMANCE

BACKGROUND

Network traffic arrives at websites from a variety of sources, including at least direct addressing, digital advertising campaigns, paid search, and natural search. For example, direct addressing may include a user inputting an URL or address in a web browser to navigate to a website. Digital advertising may include text, images, and/or video presented in connection with various websites that direct users to navigate to a website. Paid search traffic may result from presenting a website address in connection with search results for a fee. And natural search traffic may result from user selection of "organic" results of a search query of a search engine, for example.

Search engine optimization services may include processes of affecting the visibility of natural search results (e.g., unpaid search results). Optimizing a website may include editing content of the website to increase its relevance to specific keywords. In the past, website owners were able to evaluate a performance of search engine optimization services by receiving information from a search engine, for example, indicating what keywords users searched for to arrive at a particular website. However, in order to protect privacy of users, this information is often not available, making it difficult to determine if traffic is being optimized for a website.

SUMMARY

The systems, devices, and techniques described herein are directed to tracking keyword performance associated with a website and with respect to search engine results. For a list of keywords, the systems, devices, and techniques may include operations for determining a search engine ranking of a website associated with individual keywords of the list of keywords. For individual rankings associated with the keywords, the operations can include determining a selection rate associated with individual keyword rankings, which may indicate a likelihood or probability that a search result at a particular ranking will be selected.

Next, the operations may include determining a query volume (e.g., of user searches) associated with individual keywords over a time period. For example the query volume may be associated with any period of time, such as on a daily basis, weekly basis, monthly basis, etc. Based on the keyword rankings, the selection rate, and the query volume, a keyword ranking index may be determined for the particular list of keywords and a website. In some instances, the keyword ranking index may represent a volume-weighted estimate of keyword performance for a particular set of keywords. In particular, the keyword ranking index may represent a weighted sum of expected volume divided by a maximum expected volume associated with the list of keywords. Thus, the keyword ranking index provides a holistic view of keyword performance with respect to search engines and keyword rankings associated with a website.

Thus, operations described herein with respect to the keyword ranking index (KRI) can be said to be rooted in networking technology. Further, the operations described herein can track a performance of keyword ranking over time, for example, to evaluate a performance of a search engine optimization service, for example, while maintaining a privacy of user search results. The KRI can further be used to distill keyword performance over time to a single number (or set of numbers), in some cases, to present a simplified view of keyword performance.

Further, in some instances, the KRI can be used to determine or identify aspects of a website that would benefit from changes to improve a search engine ranking. For example, in some instances, the operations can include receiving changes to the structure, form, content, metadata, etc. of a website based at least in part on the KRI associated with list of keywords (and accordingly, the website). Thus, the operations discussed herein can improve the utilization of resources by targeting changes to websites based on quantifiable feedback, rather than implementing changes where the changes are not needed, so that a relatively large impact on search ranking may result from such targeted implementations.

In some instances, evaluating keyword performance over time can provide insight into expected network traffic for a website, which can be used to predict expected network traffic for making determinations to update or upgrade network topologies. In some instances, websites associated with particular keywords can be hosted on servers based on expected volume of traffic. For example, websites with high expected traffic volume can be hosted on distinct server instances to reduce congestion and/or improve aggregate network capacity.

In this manner, the systems, devices, and techniques described herein improve a functioning of a computing device by providing operations that can track keyword performance over time to predict expected network traffic for a website associated with keywords. In some instances, network topologies can be based at least in part on expected keyword-based network traffic, to improve a capacity of websites to handle traffic. Further, the KRI described herein allows website owners to evaluate a performance of search engine optimization services while maintaining privacy of users. Thus, the KRI described herein improves network privacy, which further encourages use of search engines and use of natural searches to drive network traffic.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to tracking keyword performance associated with a website and with respect to search engine results. The systems, devices, and techniques described herein can be implemented in a number of ways. Example implementations are provided below with reference to the following figures.

Figure 1:
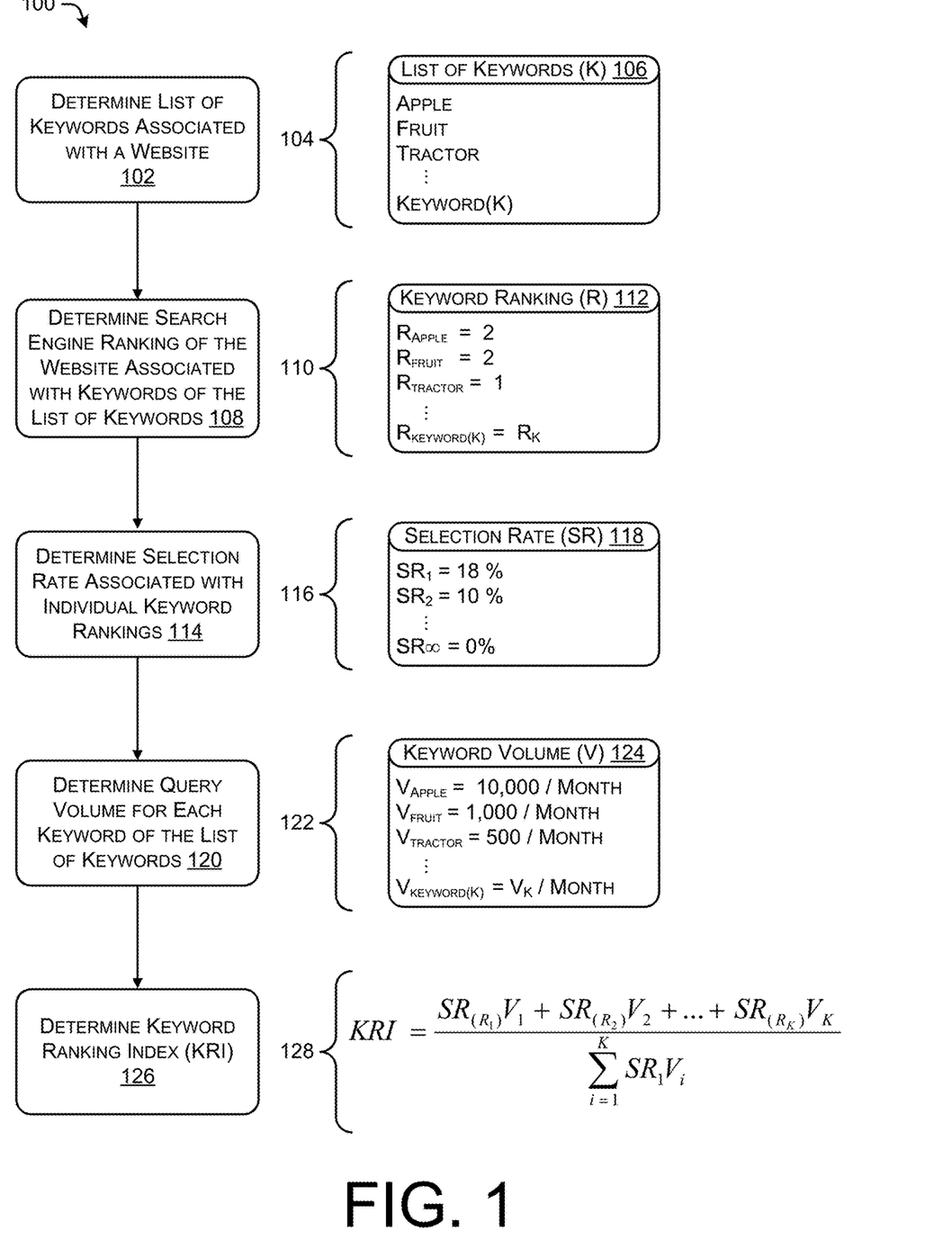
FIG. 1 illustrates a pictorial flow diagram of an example process for tracking keyword performance associated with a website based on search engine results.

FIG. 1 illustrates a pictorial flow diagram of an example process 100 for tracking keyword performance to provide a volume weighted estimate of keyword ranking At 102, the process can include determining a list of keywords associated with a website. For example, a list of keywords may be provided by a website owner or operator to a search engine optimization service for tracking performance. The list of keywords may be associated with the content, goods, and/or services associated with the website. As discussed herein, in some instances, the list of keywords may be preceded by one or more intents associated with a website, and the list of keywords may be based on an intent (e.g., an intent of a user for information when searching the Internet, or a category of information associated with the website).

As mentioned above, the list of keywords may be based in part on one or more intents provided by a user. That is, an intent may reflect an intention of a user when searching for a particular website. For example, an intent may include "farming," and the list of keywords 106 may be generated to include the terms "apple," "fruit," and "tractor" based on the intent. In some instances, an intent may be provided by a user, and the list of keywords may be determined based on one or more term expansion algorithms, market research, etc. Additional details of utilizing one or more intents to determine a list of keywords are discussed below in connection with FIG. 3.

An example 104 illustrates a list of keywords (K) 106. As illustrated, the list of keywords 106 includes the terms "apple," "fruit," "tractor," . . . , and "keyword(K)". That is, the list of keywords 106 may include any number of words or phrases, which may or may not be contextually related. In the example 104, the list of keywords 106 can be related to agricultural terms, although it may be understood that any terms may be used. Further, the list of keywords 106 is not limited to any particular number of keywords, and may include 10, 20, 100, 1000, etc., keywords. That is, the process 100 can be used to determine a performance of any number of keywords.

At 108, the process may include determining a search engine ranking of the website associated with keywords of the list of keywords. For example, the operation 108 may include using one or more automated scripts or scrapers to submit a keyword (e.g., "apple") to one or more search engines (e.g., Google, Yahoo, Bing, etc.) to determine where the website ranks in associated search results, based on the keyword provided for the search result. In an example 110, a list of keyword rankings (R) 112 is received and/or generated corresponding to the list of keywords 106. By way of example and without limitation, the keyword ranking 112 includes $R_{Apple}=2$, $R_{Fruit}=1$, and $R_{Tractor}=1$, which can be represented generically as $R_{Keyword(K)}=R_K$. That is, for a particular search engine, inputting the term "apple" into the search engine returned the target website in the search result as the second result, where results are ranked numerically (e.g., 1-10), with the most relevant result returned as the first result (e.g., ranking=1), a second most relevant result return as the second result (e.g., ranking=2), and so on.

As discussed herein, operations for determining the keyword ranking index can be performed for a plurality of search engines, and results can be aggregated to produce an aggregated keyword ranking index. Thus, the operation 108 can include determining search engine rankings for the website associated with the keywords for a plurality of search engines.

At 114, the process can include determining one or more selection rates associated with individual keyword rankings. For example, a selection rate may correspond to a probability or likelihood that an individual user will select a search result associated with a particular search result ranking. That is to say, for a particular search engine, for set of search results including results ranked 1-10, there may be a 20% probability that any user will select (or "click") the first search result. Further, there may be a 10% probability that any user will select the second search result, and so on. In some instances, the selection rate can be referred to as a "click-through rate".

An example 116 illustrates a particular selection rate (SR) 118, which includes the selection rate for the first result for a particular search engine (e.g., $SR_1=18\%$), a selection rate for the second result (e.g., $SR_2=10\%$), and a selection rate for the $\infty$-th (infinity-th) result ($SR_\infty=0\%$). In some instances, the selection rate may be specific to a particular search engine, which is to say, the selection rate can be based at least in part on the search engine returning the keyword rakings 112. In some instances, the selection rate 118 can be a table including selection rates for any number of keyword ranking (e.g., the first 100 results, the first 1000 results, etc.). In some instances, the operation 114 may include determining a plurality of selection rate tables based on various selection rate assumptions, models, or algorithms. In some instances, the selection rate 118 can be empirically determined by monitoring behavior of users over time interacting with a particular search engine. In some instances, the selection rate 118 can be received from a third-party provider that specializes in determining selection rates associated with a search engine.

At 120, the operation can include determining a query volume for each keyword of the list of keywords. In an example 122, a keyword volume (V) 124 can include, but is not limited to $V_{Apple}=10,000$ searches/month, $V_{Fruit}=1,000$ searches/month, and $V_{Tractor}=500$ searches/month, which can be represented generically as $V_{Keyword(K)}=V_K$ search/month. In some instances, the keyword volume 124 can be associated with a particular search engine. In some instances, the query volume can be associated with any period of time, such as a number of queries per day, week, month, year, etc. In some instances, the query volume may refer to a number of natural searches per month including the particular keyword. In some instances, the query volume may refer to a number of searches that correspond precisely to the keyword, or may correspond to basic variations of the keyword (e.g., apple, apples, aples, apples, etc.).

In 126, the operation may include determining a keyword ranking index (KRI) based at least in part on the operations 102, 108, 114, and 120, as disclosed herein. An example 128 illustrates the operations of determining the KRI, illustrated below in equation (1):

$$KRI = \frac{SR_{(R_1)}V_1 + SR_{(R_2)}V_2 + \ldots + SR_{(R_K)}V_K}{\sum_{i=1}^{K} SR_1 V_i} \qquad (1)$$

That is, the KRI represents the probability weighted sum of the expected volume of traffic divided by the probability weighted sum of the maximum possible amount of expected network traffic. As illustrated, the numerator of equation (1) utilizes the selection rate associated with a particular ranking position multiplied by the expected query volume of a keyword to estimate the expected traffic resulting from a ranking of a website in search results from a search engine. As further illustrated, the denominator of equation (1) utilizes a summation of the selection rate of the highest ranking (e.g., $SR_1$) multiplied by the expected query volume of each keyword, although the selection rate of any ranking position can be used as well (e.g., $SR_2$, $SR_3$, $SR_4$, etc.). That is, in some cases, it may be unlikely for a target website to ever become ranked higher than a particular position, in which case the highest expected position can be used in the denominator of equation (1).

Said differently, equation (1) represents the weighted sum of expected volume (represented in the numerator) divided by the maximum possible traffic volume that a keyword can be expected to achieve.

As equation (1) incorporates selection rates, ranking, and expected volumes for some or all of the keywords of the list of keywords 106, it can be seen that the KRI can provide a single value representative of the performance of a list of keywords with respect to a particular search engine. In some instances, the process 100 can be performed at any interval or frequency to illustrate keyword performance over time. In some instances, a KRI can be determined for individual search engines (e.g., $KRI_{Google}$, $KRI_{Yahoo}$, $KRI_{Bing}$, $KRI_{(Search\ Engine(J))}$, etc.) and can be aggregated in any manner to determine a KRI for a keyword list associated with one or many search engines.

In some instances, the operation 126 can include receiving one or more changes to a website based at least in part on the KRI associated with the website. For example, the operation 126 can include receiving one or more updates or changes to code, content, structure, metadata, etc. associated with the website to implement changes to improve a KRI associated with the website.

Figure 2:
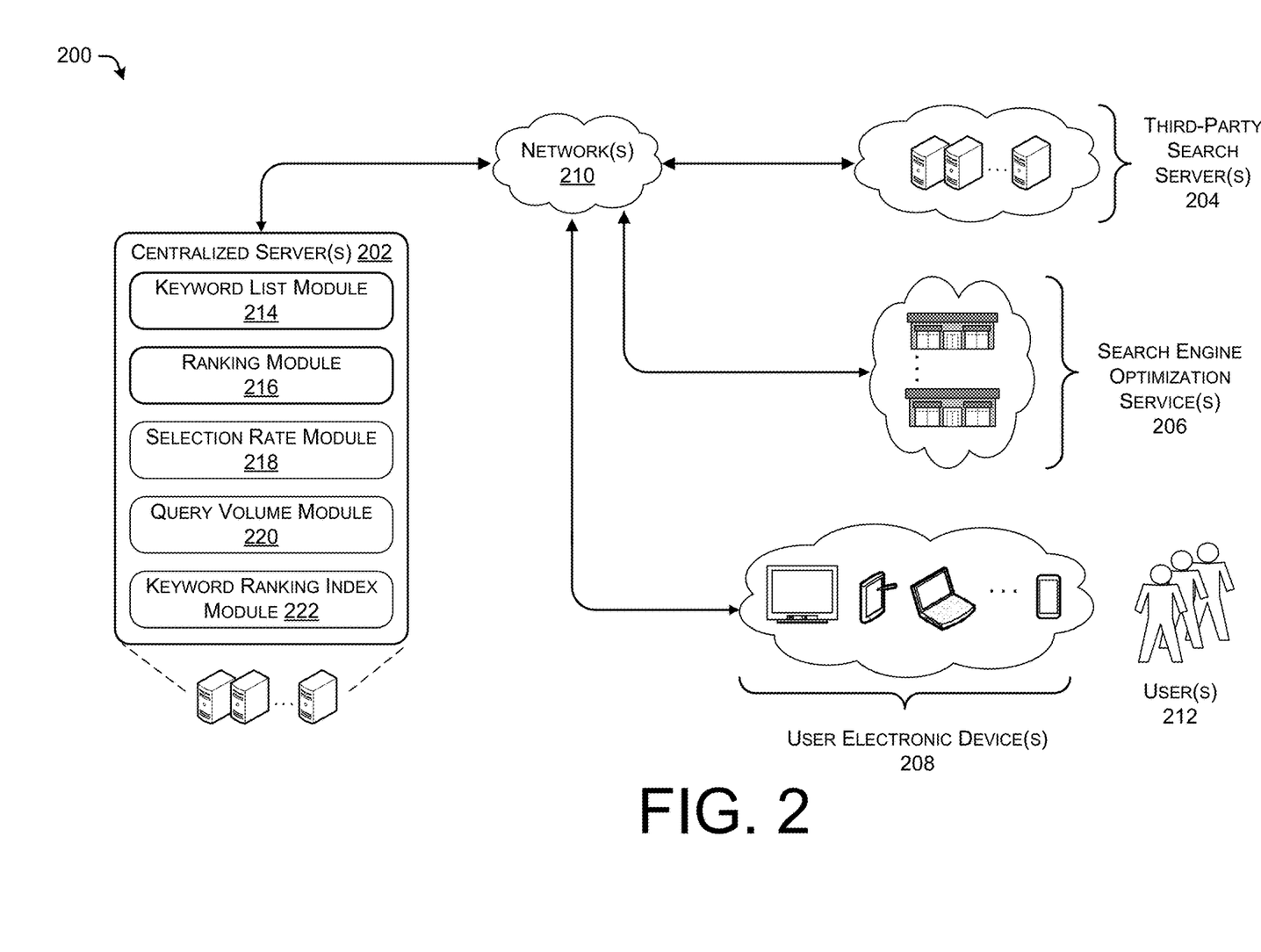
FIG. 2 illustrates an example environment for tracking keyword performance in accordance with embodiments of the disclosure.

FIG. 2 illustrates an example environment 200 for tracking keyword performance in accordance with embodiments of the disclosure. In some instances, the environment 200 can include one or more centralized servers 202 in communication with one or more third-party search server(s) 204, search engine optimization service(s) 206, and/or user electronic devices 208 via one or more network(s) 210 (e.g., the Internet). In some instances, the third-party search server(s) 204 may represent one or more search engines including, but not limited to, search engines such as Google, Yahoo, Bing, etc. The one or more centralized servers 202 (also referred to as a centralized server 202) may represent a server hosting a website that is accessible to the user electronic devices 208 in response to natural or organic searching, as discussed herein. Further, in some instances, the search engine optimization services 206 may be an entity responsible for increasing rankings of websites hosted by or associated with the centralized server 202 in response to a search conducted by one or users 212 utilizing the third-party search servers 204. In some instances, the search engine optimization services 206 may be incorporated into the centralized server 202, and in some cases, the search engine optimization services 206 may be a separate and distinct entity from the centralized server 202.

The centralized server 202 may include one or more modules, such as a keyword list module 214, a ranking module 216, a selection rate module 218, a query volume module 220, and a keyword ranking index module 222.

The keyword list module 214 may include functionality to receive, generate, or otherwise determine a list of keywords to track the performance thereof, as discussed herein. In one example, the keyword list module 214 may receive a list of keywords (e.g., words and/or phrases) that are associated with content presented in connection with the centralized servers 202. For example, the centralized server 202 may host one or more websites providing content, goods, and/or services. As noted above, the keyword list module 214 may include any number of keywords, including any number of words and/or phrases.

The ranking module 216 may include functionality to query one or more search engines provided by the third-party search servers 204 with one or more keywords of the keyword list module 214 to determine a ranking of a website hosted by the centralized server 202 within search results provided by the third-party search servers 204. For example, the ranking module 216 may periodically perform searches using one or more keywords, determine a ranking of a website in response to the one or more keywords, and store the one or more rankings in a ranking table, for example, stored in the keyword ranking module 216. The ranking module 216 can determine rankings for keywords with respect to one or more search engines. The ranking module 216 can determine rankings at any regular or irregular interval or frequency. In some instances, the ranking module 216 can determining rankings with respect to keywords before and/or after implementing changes for a website associated with the centralized server 202.

The selection rate module 218 may include functionality to determine selection rates associated with various ranked results associated with a particular search engine. For example the selection rate module 218 may receive or otherwise determine a selection rate table indicating a likelihood or probability associated with a user (e.g., the user 212) selecting a search result presented as a first search result, as second search result, a third search result, and so on. In some instances, the selection rate may be referred to as a click-through rate. In some cases, the selection rate may correspond to a metric that measures the number of "selections" or "clicks" that a website, link, web page, advertisement, etc. receives per number of impression, based at least in part on the ranking of the website with search results. In some instances, the selection rate module 218 may provide for a graphical user interface, for example, to allow user input to change or vary one or more selection rate assumptions. In some instances, the selection rate module 218 may aggregate a number of selection rate tables received from a variety of sources to determine an aggregated selection rate table. In some instances, the aggregation may include assigning weights to various selection rate tables based at least in part on a confidence level associated with a source of the selection rate table.

The query volume module 220 may include functionality to determine a query volume associated with individual keywords with respect to individual search engines. For example, the query volume module 220 can include functionality to request query volume information from one or more of the third-party search servers 204. In some instances, the query volume module 220 may determine a query volume for any period of time, including but not limited to queries per hour, minute, day, week, month, etc. In some instances, the query volume module 220 may determine a query volume based at least in part on accessing information associated with paid search terms.

The keyword ranking index (KRI) module 222 may include functionality to determine a volume-weighted estimate of keyword performance for a particular set of keywords. In one example, the keyword ranking index may represent a weighted sum of expected volume divided by a maximum expected volume associated with the keyword list. As discussed above with respect to FIG. 1, the KRI may be based in part on the probability weighted sum of volumes associated with individual keywords, and the maximum possible selection rate for particular keywords associated with a search engine. In some instances, one or more selection rates may be used (instead of or in addition to the maximum selection rate for particular keywords associated with a search engine).

Additional aspects of the centralized server(s) 202 and keyword rating index operations are discussed further in connection with FIGS. 3-7, below.

Figure 3:
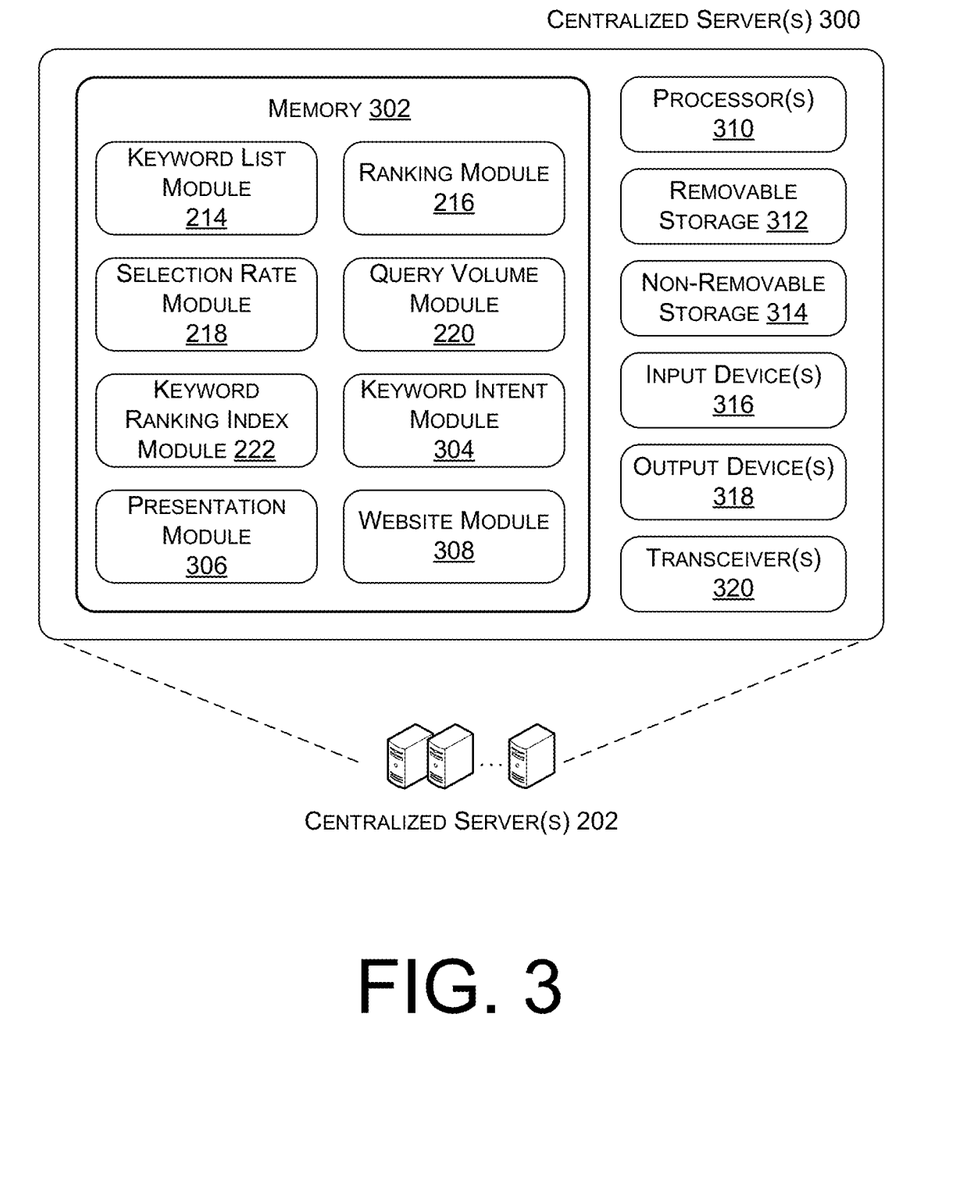
FIG. 3 illustrates an example centralized server configured to evaluate keyword performance over time in the context of search engine optimization.

FIG. 3 illustrates an example centralized server 300 configured to evaluate keyword performance over time in the context of search engine optimization. The centralized server 300 can correspond to the centralized server(s) 202 of FIG. 2, and may be used to implement the various operations described herein. It is to be understood in the context of this disclosure that the centralized server 300 can be implemented as a single device or as a plurality of devices with modules and data distributed among them. For example, the centralized server may include memory 302 storing the keyword list module 214, the ranking module 216, the selection rate module 218, the query volume module 220, the keyword ranking index module 222, a keyword intent module 304, a presentation module 306, and a website module 308, as described herein. Also, the centralized server 300 includes processor(s) 310, a removable storage 312 and non-removable storage 314, input device(s) 316, output device(s) 318, and transceiver(s) 320.

In various embodiments, memory 302 is volatile (such as RANI), non-volatile (such as ROM, flash memory, etc.) or some combination of the two. The keyword list module 214, the ranking module 216, the selection rate module 218, the query volume module 220, the keyword ranking index module 222, the keyword intent module 304, the presentation module 306, and the website module 308 stored in the memory 302 can comprise methods, threads, processes, applications or any other sort of executable instructions. The keyword list module 214, the ranking module 216, the selection rate module 218, the query volume module 220, the keyword ranking index module 222, the keyword intent module 304, the presentation module 306, and the website module 308 can also include files and databases.

Details of the keyword list module 214, the ranking module 216, the selection rate module 218, the query volume module 220, and the keyword ranking index module 222 are provided above in the discussion of FIG. 1. In general, the keyword list module 214 may include functionality to receive and/or determine one or more keywords which comprise a list of keywords associated with a website to be optimized by a search engine optimization service (e.g., the search engine optimization service 206). As discussed herein, in some embodiments, the keyword list module 214 may determine one or more keywords based on an intent associated with website content and/or search queries. In general, the ranking module 216 may include functionality to determine rankings of a website (e.g., associated with the website module 308) returned from a natural search of one or more search engines. In general, the selection rate module 218 can include functionality to determine selection rates associated with a probability that a user will select, click, activate, or otherwise navigate a web browser, for example, to a website returned as a search result with a particular ranking. As discussed above, the selection rate module 218 may receive and or determine one or more selection rate tables associated with a particular search engine (e.g., based on differing algorithms or assumptions to determine an aggregated selection rate table) or one or more selection rate tables associated with a plurality of search engines. In general, the query volume module 220 can include functionality to determine average or expected query volumes associated with particular keywords and associated with a particular search engine. Further, and in general, the keyword ranking index module 222 can include functionality to determine a volume-weighted estimate of keyword performance for a particular set of keywords associated with a website.

In some embodiments, the keyword intent module 304 can include functionality to receive one or more intents associated with a website, for example, where the intents may be associated with categories of information or areas of interest with respect to a website. In one example of an agricultural website, various intents may include "crops", "animals", and "machinery". Based at least in part on the intents, the keyword intent module 304 and the keyword list module 214 may expand the intents to determine the list of keywords to be evaluated as discussed herein. For example, for the "crops" intent, various keywords may include "apples", "wheat", "barley", "oranges," etc. And accordingly, for each particular intent, a keyword rating index can be determined (e.g., $KRI_{Crops}$, $KRI_{Animals}$, $KRI_{Machinery}$). Thus, a KRI associated with a particular intent can represent individual lists of keywords, allowing for increased information regarding a "performance" or "relevancy" of keywords, and of a search engine optimization service, as discussed herein. Further, providing KRI information with respect to intents identifies content and/or aspects of the website to be upgrade, updated, or changed based at least in part on the KRI. Thus, the KRI can enable targeted implementation of upgrades to optimize websites, as discussed herein.

In some embodiments, the presentation module 306 can include functionality to present the KRI associated with a list of keywords in connection with various graphical user interfaces. In some instances, the presentation module 306 provides a simplified interface to quickly and easily illustrate a performance of a website with respect to natural search associated with a list of keywords. The presentation module 306 can provide any graphs, charts, or illustrates to various computing devices (e.g., associated with the centralized server 202 or the search engine optimization services 206) to convey the keyword performance, as discussed herein. In one example, the presentation module 306 can present a graphical user interface including a snapshot of a website over time and an associated KRI over time to illustrate changing content (or structure, form, metadata, etc.) of the website with respect to changing KRI.

In some embodiments, the website module 308 can include functionality to generate, edit, and/or host a website for optimization, as discussed herein. In some instances, websites associated with the website module 308 can be developed using a variety of programming languages or techniques, including but not limited to: HTML; HTML5; PHP; JavaScript; Java; Python; Ruby; Perl; C; C++; Shell; C#; Hack; Erlang; Haskell; CSS; etc. Further, websites may be developed using any platform, such as Adobe Experience Manager (AEM), and may be compatible with any operating system (e.g., Android, iOS, Windows, Chrome OS, etc.). Further, in some examples, the website module 308 can receive one or more edits to implement website optimizations based at least in part on the one or more KRIs, as discussed herein.

In some embodiments, the one or more processor(s) 310 are central processing units (CPUs), graphics processing units (GPUs), or both CPU and GPU, or other processing units or components known in the art.

The centralized server 300 also includes additional data storage devices (removable and/or non-removable) such as, for example, magnetic disks, optical disks, or tape. Such additional storage is illustrated in FIG. 3 by removable storage 312 and non-removable storage 314. Tangible computer-readable media can include volatile and nonvolatile, removable and non-removable media implemented in any method or technology for storage of information, such as computer readable instructions, data structures, program modules, or other data. Memory 302, removable storage 312 and non-removable storage 314 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 300. Any such tangible computer-readable media can be part of the centralized server 300.

The centralized server 300 also can include input device(s) 316, such as a keypad, a cursor control, a touch-sensitive display, voice input device, etc., and output device(s) 318 such as a display, speakers, printers, haptic feedback, etc. These devices are well known in the art and need not be discussed at length here.

As illustrated in FIG. 3, the centralized server 200 also includes one or more wired or wireless transceiver(s) 320. For example, the transceiver(s) 320 can include a network interface card (NIC), a network adapter, a LAN adapter, or a physical, virtual, or logical address to connect to the network(s) 210, the third-party search servers 204, the search engine optimization services 206, and the user electronic devices 208, for example. To increase throughput when exchanging wireless data, the transceivers 320 can utilize multiple-input/multiple-output (MIMO) technology. The transceiver(s) 320 can comprise any sort of wireless transceivers capable of engaging in wireless, radio frequency (RF) communication. The transceivers 320 can also include other wireless modems, such as a modem for engaging in Wi-Fi, WiMAX, Bluetooth, or infrared communication.

FIGS. 4-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
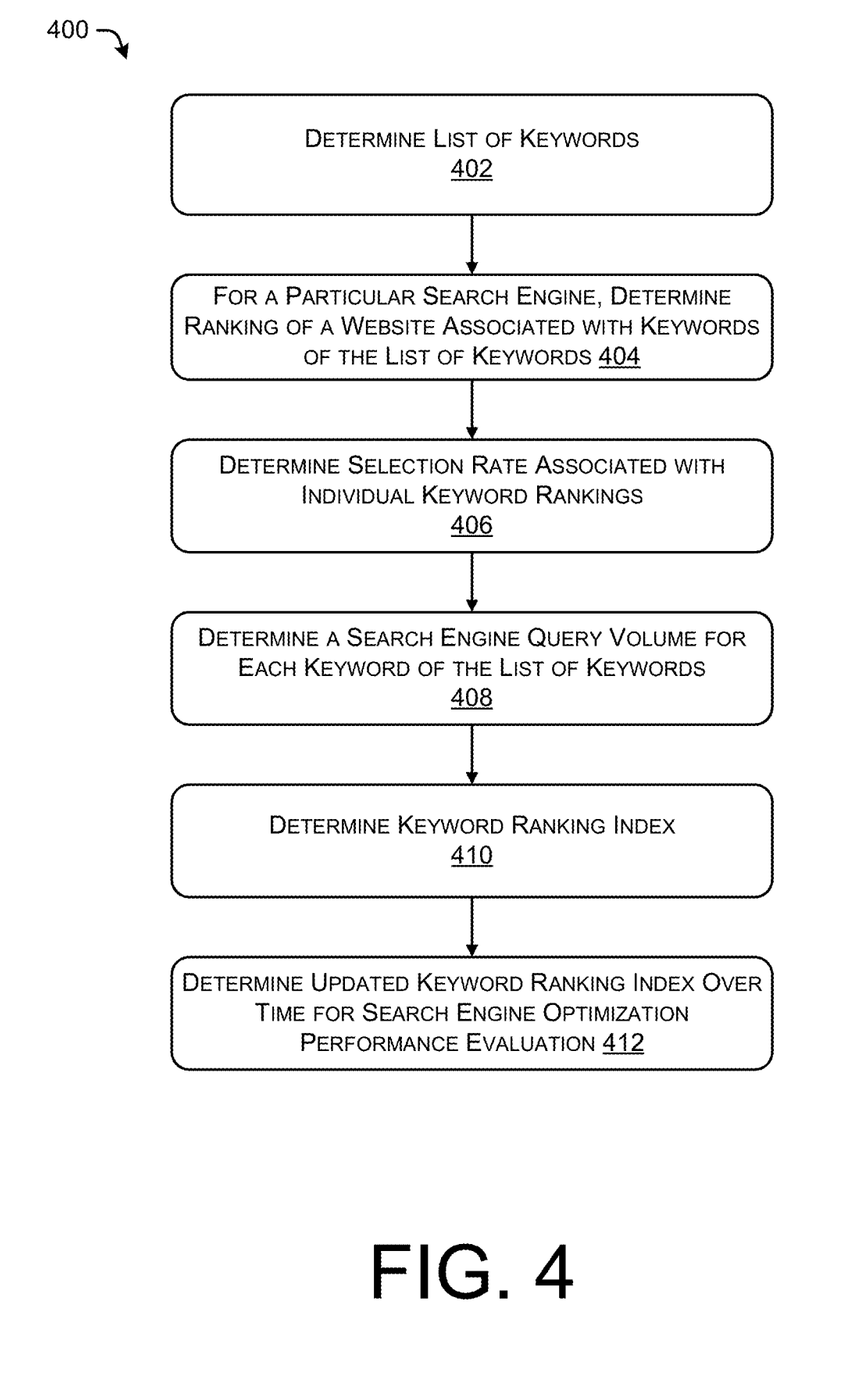
FIG. 4 illustrates an example process for evaluating a performance of keywords over time.

FIG. 4 illustrates an example process for evaluating a performance of keywords over time, in accordance with embodiments of the disclosure. The example process 400 can be performed by a centralized server (e.g., the centralized server 202 or 300), for example. Further, some or all of the process 400 can be performed by one or more components in the environment 200.

At 402, the operation can include determining a list of keywords. Similar to the operation 102, the operation 402 can include receiving any number of keywords (e.g., words and/or phrases) that are associated with a target website. For example, the keywords may be related to one or more of content, good, and services associated with the website. In some examples, the keywords may be relevant to a customer base, may be common search terms, or may otherwise be associated with the target website. As discussed herein, in some instances, the list of keywords may be based at least in part on one or more intents associated with a website or with one or more user search queries.

At 404, the operation can include, for a particular search engine, determining a ranking of a website associated with keywords of the list of keywords. For example, the operation 404 can include inputting a keyword of the list of keywords as a search query to the particular search engine to determine a ranking of the website in the search results provided by the search engine. In some instances, the operation 404 can be performed for each keyword and for each search engine. For example, if a list of keywords includes ten terms, and a number of particular search engines includes four search engines, the operation 404 can be performed forty times to determine rankings of the website in response to keyword searches using the individual search engines. Of course, in some instances, any subset of keywords can be search across any combination of search engines. Further, the operation 404 can be performed at any time or with any regular or irregular frequency or interval, to determine keyword performance (e.g., with respect to the website) over time. In some instances, the operation 404 may be performed before changes to the website are implemented and after the changes are implemented to evaluate an effect of the changes with respect to the ranking of the website for the various search engines.

At 406, the operation can include determining a selection rate associated with individual keyword rankings. In one example, a selection rate may be associated with a particular search result ranking (e.g., as the first search result, second search result, third search result, and so on) associated with a set of search results provided by a search engine, and may correspond to the probability or likelihood that a user will navigate to a website listed as a particular search result. In some instances, the operation 406 may include determining selection rates for each search engine subject to the search engine optimization operations discussed herein. In some instances, the operation 406 can include receiving one or more selection rate tables from third-party organizations, and in some instances, the selection rates can be set or varied by a graphical user interface presented to a user.

At 408, the operation can include determining a search engine query volume for each keyword of the list of keywords. For example, the operation can include determining that, for a particular keyword and for a particular search engine, a search engine receives a number N of queries per month (or day, week, year, etc.) directed to the particular keyword. Thus, the operation 408 can determine which keywords of the list of keywords have high search volumes. As noted throughout the disclosure, the query volumes can be determined on a keyword basis, and on an individual search engine basis.

At 410, the operation can include determining a keyword ranking index (KRI). As discussed above with respect to FIG. 1, for example, the KRI can be based at least in part on the keyword ranking for individual keywords, the selection rate for a search engine ranking, and a query volume for a keyword for a particular search engine. Thus, the operation 410 can determine a volume-weighted estimate of keyword performance for a particular set of keywords. In some examples, a plurality of KRIs can be determined for various intents associated with a website.

At 412, the operation can include determining an updated keyword ranking over time for search engine optimization performance evaluation. For example, the operation 412 may include receiving one or more changes to a structure, form, content, metadata associated with the website subject to the KRI operations discussed herein. Following the implementation of one or more changes (or following other marketing or advertising efforts associated with the website), the operation 412 can determine the ranking of the website (e.g., similar to the operation 404 discussed above) and compare the rankings over time to determine a performance of the search engine optimization operations. In some instances, the operation 412 can include aggregating a KRI for various search engines and evaluating the aggregated KRI or the various KRIs with respect to the various search engines. For example, implementations to a website may improve a KRI with respect to a first search engine and may degrade a KRI with respect to a second search engine. In such case, the operation 412 can determine if, in the aggregate, the implementations to the website do, in fact, improve website performance with respect to the list of keywords discussed herein.

Figure 5:
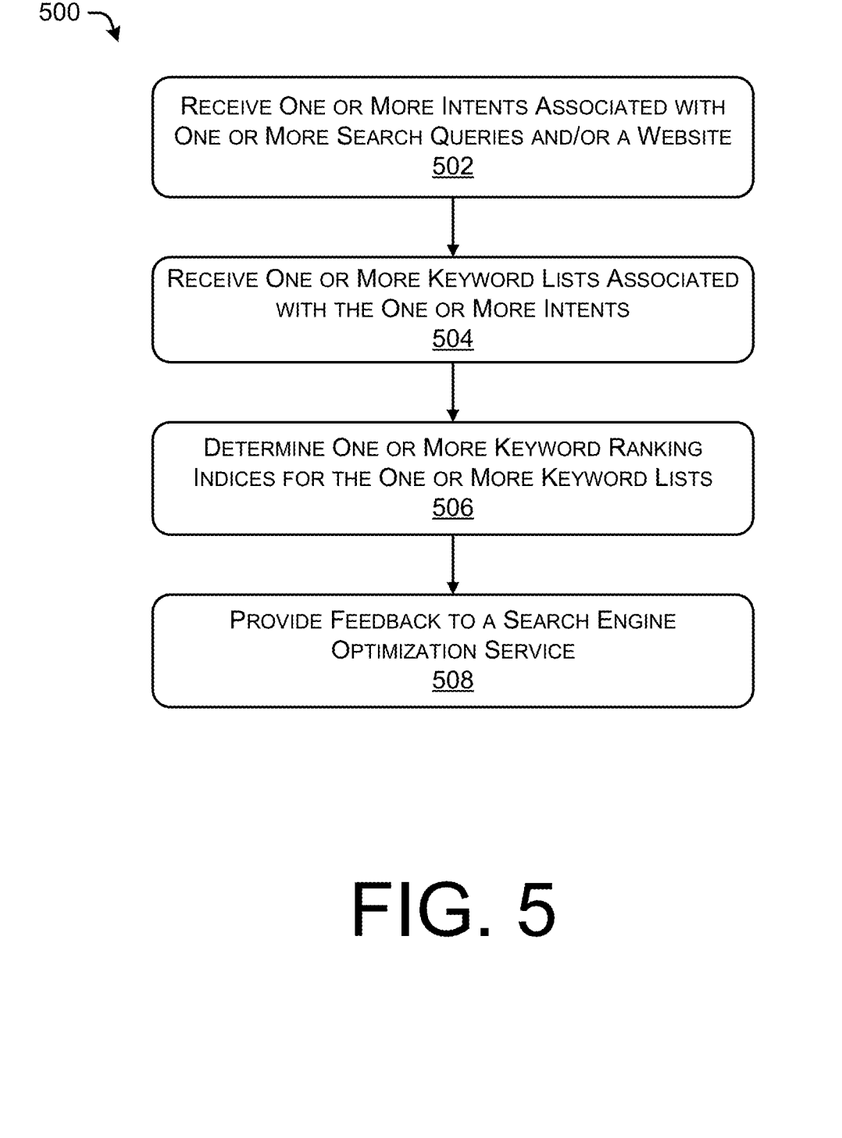
FIG. 5 illustrates an example process for evaluating a performance of keywords based on search intent.

FIG. 5 illustrates an example process 500 for evaluating a performance of keywords based on search intent. The example process 500 can be performed by a centralized server (e.g., the centralized server 202 or 300), for example. Further, some or all of the process 500 can be performed by one or more components in the environment 200.

At 502, the operation can include receiving one or more intents associated with one or more search queries and/or a website. For example, the one or more intents may include a sentiment or generalization of search queries typically submitted by users in a particular market segment or when performing a task associated with a website, for example. As discussed above, for a website directed to agricultural content, various intents may include "crops", "animals", and "machinery". These intents may broadly categorize or refer to classes of information associated with the website, or may correspond to broad categorizations of typical user searches when searching or content associated with agricultural websites. In some instances, one or more intents may be specified by a website owner or a search engine optimization service.

At 504, the operation can include receiving one or more keyword lists associated with the one or more intents. For example, the operation 504 may include expanding the one or more intents to determine a list of keywords associated with the various intents. In some instances, the operation may include deriving one or more intents based on the intent received in the operation 502. For example, in as case of an intent "crops", additional intents of "fruits" and "vegetables" may be derived from the original intent. Subsequently, or instead of deriving intents, a list of keywords may be received or otherwise determined based on the various intents. For example, the operation 504 may include receiving the one or more keyword lists from a market research operation that analyzes search queries to determine lists of keywords associated with various intents. In some instances, the operation 504 may include analyzing content associated with the website to determine keywords based on the intents received in the operation 504. Additional operations for determining lists of keywords may include determining synonyms, thesauruses, word clouds, word maps, etc.

At 506, the operation can include determining one or more keyword ranking indices (KRIs) for the one or more keyword lists. For example, the operation 506 can include determining a KRI for an individual keyword list, whereby the individual keyword is associated with an individual intent. Thus, for a particular website, the operation 506 may determine a plurality of KRIs associated with the website to provide information of the website with respect to the various content (and search areas) associated with the website. In some examples, the operation 506 includes determining a KRI, as discussed above with respect to FIG. 1.

At 508, the operation can include providing feedback to a search engine optimization service. For example, the search engine optimization service may be tasked with or may otherwise be responsible with improving a ranking of the website in various search engine results with respect to the intents and/or lists of keywords. Thus, by determining the KRIs of the website and providing the feedback to the search engine optimization service (e.g., as one or more graphical user interfaces, including but not limited to text, images, videos, audio, haptic feedback, etc.) the search engine optimization service can be held accountable for any changes made to the structure, form, content of the website to improve the ranking of the website, as discussed herein.

Figure 6:
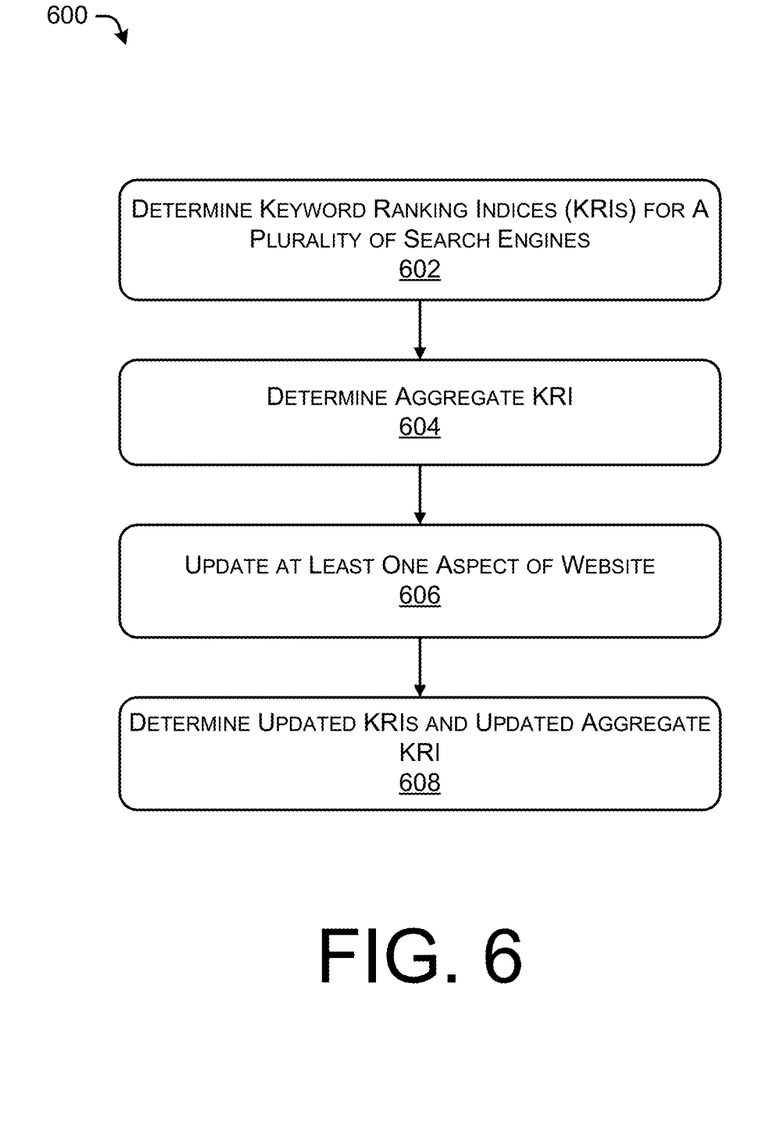
FIG. 6 illustrates an example process for determining an aggregated keyword ranking index associated with a plurality of search engines.

FIG. 6 illustrates an example process 600 for determining an aggregated keyword ranking index associated with a plurality of search engines. The example process 600 can be performed by a centralized server (e.g., the centralized server 202 or 300), for example. Further, some or all of the process 600 can be performed by one or more components in the environment 200.

At 602, the operation can include determining keyword ranking indices (KRIs) for a plurality of search engines. For example, for individual search engines and with respect to a particular website, KRIs can be determined as discussed herein. In some instances, the list of keywords for each search engine can be substantially identical to provide an even comparison of KRIs between different search engines. In some examples, KRIs can be determined as discussed above with respect to FIG. 1.

At 604, the operation can include determining an aggregate KRI. For example, the various KRIs determined in the operation 602 can be averaged (or aggregated using a weighted average) to determine the aggregated KRI. In some instances, individual KRIs can be weighted according to a query volume associated with the individual search engines. That is, in some cases, a KRI associated with a first search engine having a higher query volume for a keyword can be weighted more heavily than a KRI associated with a second search engine having a lower query volume for the keyword relative to the first search engine.

At 606, the operation can include updating at least one aspect of a website associated with the KRIs of the aggregated KRI. For example, the operation 606 can include receiving one or more changes to structure, form, content, metadata, etc., of the website to effect rankings of the website relative to the keywords, as discussed herein.

At 608, the operation can include determining updated KRIs and an updated aggregate KRI. For example, the operation 608 can include determining updated individual KRIs following the implementation of the changes to the website (e.g., in the operation 606). In some instances, the operation 608 can include comparing the first aggregated KRI (e.g., determined in the operation 604) with the updated aggregated KRI (e.g., determined in the operation 608) to determine a performance of keywords before and after implementing changes to the website.

In one embodiments, the process 600 can be performed for various intents associated with a website, as discussed herein. Thus, in a case involving a plurality of intents, with an individual intent corresponding to an individual list of keywords, an aggregated KRI and updated aggregated KRI can be determined with respect to each intent, as discussed herein.

Figure 7:
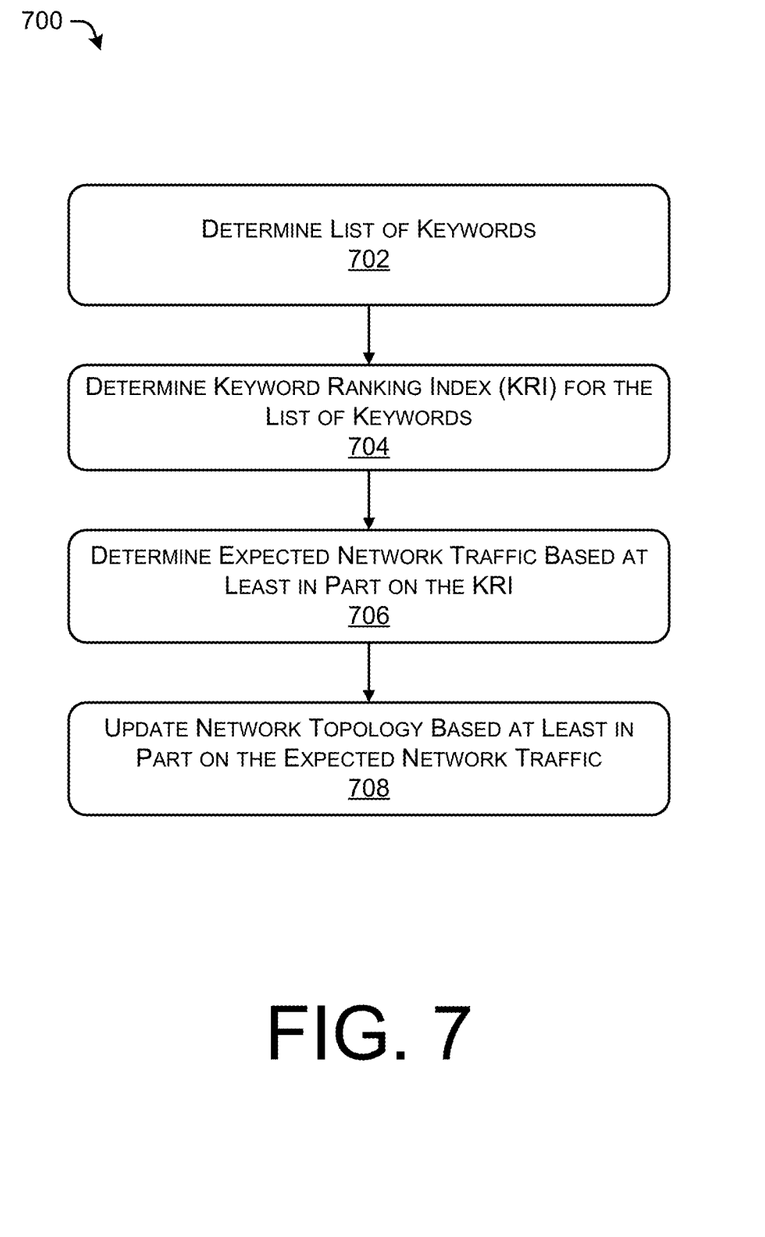
FIG. 7 illustrates an example process for updating a network topology based at least in part on expected network traffic and an associated keyword ranking index.

FIG. 7 illustrates an example process 700 for updating a network topology based at least in part on expected network traffic and an associated keyword ranking index. The example process 700 can be performed by a centralized server (e.g., the centralized server 202 or 300), for example. Further, some or all of the process 700 can be performed by one or more components in the environment 200.

At 702, the operation can include determining a list of keywords associated with a website, as discussed herein. In some examples, the operation 702 can include determining one or more intents of a website, and determine the list of keywords based at least in part on the intents, as discussed herein.

At 704, the operation can include determining a keyword ranking index (KRI) for the list of keywords, as discussed herein. In some examples, the operation 704 can include determining an aggregated KRI associated with a plurality of search engines.

At 706, the operation can include determining an expected volume of network traffic based at least in part on the KRI. For example, as discussed above, determining the KRI can include determining expected volume of network traffic based at least in part on a ranking of a website in response to a keyword search of a search engine. In some instances, the operation 706 can include determining a highest expected volume of network traffic associated with a keyword as a minimum level of traffic to be expected in association with hosting a website. That is, in some cases, a minimum expected level of traffic can be based on the highest combination of selection rate and expected volume for a particular keyword. In some instances, the operation 706 can include determining traffic from additional sources, such as based at least in part on paid search, direct addressing, marketing campaigns, etc. Thus, in some instances, a total expected traffic can be based at least in part on the expected traffic based at least in part on the KRI.

At 708, the operation can include updating at least a portion of a network topology based at least in part on the expected volume of network traffic. For example, the operation 708 can include upgrading a bandwidth, capacity for simultaneous connections, backend databases, ports, routers, processors, memory, etc., to handle the expected volume of network traffic.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   a memory storing computer-executable instructions that, when executed by the one or more processors, cause the one or more processors to perform operations comprising:
   determining a list of keywords, the list of keywords including a plurality of keywords associated with a website;
   determining a plurality of search engine rankings associated with the website in response to providing one or more keywords of the list of keywords to a search engine, wherein an individual search engine ranking of the plurality of search engine rankings is associated with an individual keyword of the list of keywords;
   determining a plurality of selection rates, an individual selection rate of the plurality of selection rates associated with a probability that a search result associated with the individual search engine ranking will be selected by a user;
   determining a plurality of query volumes, an individual query volume of the plurality of query volumes associated with the individual keyword of the list of keywords, the individual query volume indicating at least a number of search queries received by the search engine, the number of search queries associated with a period of time; and
   determining a keyword ranking index, the keyword ranking index based at least in part on the list of keywords, the plurality of selection rates, and the plurality of query volumes, the keyword ranking index representing a volume-weighted estimate of keyword performance of the plurality of keywords associated with the website.

2. The system of claim 1, wherein the determining the keyword ranking index is based at least in part on a ratio of a first value and a second value, the first value including a product of the individual selection rate and the individual query volume, and the second value including a summation of individual products of a highest selection rate of the plurality of selection rates and individual volumes of the plurality of query volumes.

3. The system of claim 1, the operations further comprising:
   receiving at least one change to at least one of a structure, a form, a content, or metadata associated with the website; and
   implementing the change to the website to generate an updated website.

4. The system of claim 3, wherein the keyword ranking index is a first keyword ranking index, the operations further comprising:

determining a second keyword index associated with the updated website; and comparing the first keyword ranking index and the second keyword ranking index.

5. A system comprising:

one or more processors; and a memory storing computer-executable instructions that, when executed by the one or more processors, cause the one or more processors to perform operations comprising:

determining a list of keywords associated with a website;

determining a search engine ranking of the website associated with a keyword of the list of keywords;

determining a selection rate associated with the search engine ranking;

determining a query volume associated with the keyword and a search engine associated with the search engine ranking; and determining a keyword ranking index based at least in part on the selection rate, the query volume, and a maximum selection rate associated with search results provided by the search engine.

6. The system of claim 5, the operations further comprising determining the list of keywords based at least in part on one or more intents associated with the website, the one or more intents associated with a category of information accessible via the website.

7. The system of claim 5, wherein the selection rate is one of a plurality of selection rates, wherein the selection rate is associated with a probability that the search engine ranking included in a search result will be selected by a user.

8. The system of claim 5, wherein the selection rate is independent of the keyword associated with the search engine ranking.

9. The system of claim 5, wherein the query volume is one of a plurality of query volumes, the query volume indicating at least an expected number of search queries received by the search engine within a period of time.

10. The system of claim 5, wherein the keyword ranking index represents a volume-weighted estimate of keyword performance of the list of keywords associated with the website.

11. The system of claim 5, wherein the determining the keyword ranking index is further based at least in part on a ratio of a first value and a second value, the first value including a product of the selection rate and the query volume, and the second value including a summation of individual products of a maximum selection rate associated with search results provided by the search engine and individual ones of a plurality of query volumes associated with the list of keywords.

12. The system of claim 5, the operations further comprising providing the keyword ranking index to a search engine optimization service for presentation via one or more graphical user interfaces.

13. The system of claim 5, wherein the keyword ranking index is a first keyword ranking index, and wherein the search engine is a first search engine, the operations further comprising:

determining a second keyword ranking index associated with a second search engine; and determining an aggregate keyword ranking index based at least in part on the first keyword ranking index and the second keyword ranking index.

14. A processor-implemented method comprising:

determining a list of keywords associated with a website;

determining a search engine ranking of the website associated with a keyword of the list of keywords;

determining a selection rate associated with the search engine ranking;

determining a query volume associated with the keyword and a search engine associated with the search engine ranking; and determining a keyword ranking index based at least in part on the selection rate, the query volume, and a maximum selection rate associated with search results provided by the search engine.

15. The processor-implemented method of claim 14, further comprising determining the list of keywords based at least in part on one or more intents associated with the website, the one or more intents associated with a category of information accessible via the website.

16. The processor-implemented method of claim 14, wherein the selection rate is one of a plurality of selection rates, wherein the selection rate is associated with a probability that the search engine ranking included in a search result will be selected by a user.

17. The processor-implemented method of claim 14, wherein the keyword ranking index represents a volume-weighted estimate of keyword performance of the list of keywords associated with the website.

18. The processor-implemented method of claim 14, wherein the determining the keyword ranking index is further based at least in part on a ratio of a first value and a second value, the first value including a product of the selection rate and the query volume, and the second value including a summation of individual products of a maximum selection rate associated with search results provided by the search engine and individual ones of a plurality of query volumes associated with the list of keywords.

19. The processor-implemented method of claim 14, further comprising providing the keyword ranking index to a search engine optimization service for presentation via one or more graphical user interfaces.

20. The processor-implemented method of claim 14, wherein the keyword ranking index is a first keyword ranking index, and wherein the search engine is a first search engine, the processor-implemented method further comprising:

determining a second keyword ranking index associated with a second search engine; and determining an aggregate keyword ranking index based at least in part on the first keyword ranking index and the second keyword ranking index.

* * * * *